Feb. 26, 1952     G. F. LINCKS ET AL     2,587,342
FUSELESS CIRCUIT INTERRUPTING DEVICE
Filed Dec. 23, 1947     2 SHEETS—SHEET 1

Inventors
George F. Lincks,
Sidney R. Smith, Jr.,
by Ernest H. Britton
Their Attorney.

Feb. 26, 1952 G. F. LINCKS ET AL 2,587,342
FUSELESS CIRCUIT INTERRUPTING DEVICE
Filed Dec. 23, 1947 2 SHEETS—SHEET 2

Inventors:
George F. Lincks,
Sidney R. Smith, Jr.,
by Ernest C. Britton
Their Attorney.

Patented Feb. 26, 1952

2,587,342

UNITED STATES PATENT OFFICE 2,587,342

FUSELESS CIRCUIT INTERRUPTING DEVICE

George F. Lincks and Sidney R. Smith, Jr., Pittsfield, Mass., assignors to General Electric Company, a corporation of New York Application December 23, 1947, Serial No. 793,458

13 Claims. (Cl. 200—88)

Our invention relates to a new and improved circuit interrupting device and more particularly to an interrupter for electric power distribution systems in which our device operates as a self-clearing interrupter under certain circuit conditions, while under other circuit conditions it operates in coordination with an automatically operating reclosing circuit breaker or similar interrupting device to disconnect faulty apparatus or a branch circuit from the system during the interrupting operation of the recloser.

Since the cost of an automatic fuseless circuit opening device increases directly as its interrupting ability increases, the employment of the desired number of such devices having an interrupting ability to care for all faults, regardless of magnitude, which might occur either out near the end of a long rural line or up near the power source on a large distribution system has been economically prohibitive. Only a very few of these devices would be subject to the high fault current, since the magnitude of fault currents is greatly reduced by line impedance at relatively short distances from the power source, even on large systems. Thus, relatively few of the circuit-opening devices which are located close to the power source must be capable of interrupting the maximum values of fault current. Therefore, for the majority of such devices installed, spending a great deal of money to provide an ability to interrupt high fault currents is economically impractical. Nevertheless, any circuit-opening device for overcurrent protection on a distribution system must be capable of providing protection, not only at the lower currents out on the line but for the highest currents available at the power source, since improper or lack of protection at the power source can have more detrimental effect on the service continuity of the system as a whole than can similar failure to provide suitable protection further out along the line. Moreover, such devices are not intended to distinguish between permanent and temporary faults and, therefore, isolate the portion of the circuit in which they are installed by interruption of not only permanent faults thereon but temporary faults as well. As a result, automatic fuseless circuit opening devices which are not designed to interrupt a circuit have been developed to work in cooperation with an automatic recloser or similar device which is designed to interrupt the highest faults expected on the distribution system. However, the coordinated relationship between all such devices and a reclosing circuit breaker in the system is such that upon the occurence of a fault, regardless of magnitude, in the branch in which the device has been installed the recloser operates one or more times to interrupt the circuit before the automatic circuit opening device operates to isolate the particular branch which has been faulted. Such interruption of the recloser not only interrupts the faulted branch circuit but also the main feeder beyond the recloser location and other branch circuits. These momentary interruptions of service to all customers on the load side of and beyond the recloser location, including those not receiving power from the faulted circuit, obviously are undesirable.

Moreover, such non-self-clearing-circuit-opening devices have never been conceived of as being made to function to isolate the very low currents such as result from faults on the secondary line leading from a distribution transformer, since such currents are lower than the normal minimum tripping currents of the reclosers upon which non-self-clearing-circuit-opening devices depend for the circuit-opening function. Thus, these non-self-clearing devices are, as hereinbefore described, incapable of protecting apparatus, such as transformers, from these low fault currents. Non-self-clearing-fuseless-circuit-opening devices have been made, which, when tripped by these low currents from secondary faults, throw a short circuit on the primary line and then depend on the recloser in the circuit between them and the supply to interrupt the short-circuit current and thus to make it possible for them to isolate the faulted transformer while the recloser has the circuit open. Such operation imposes many unnecessary operations on the higher cost recloser, thereby increasing the maintenance expense and causing momentary outages to hundreds of consumers for faults which should have caused an outage to only one or a very few consumers fed by the one transformer. Furthermore, this means two totally different fuseless-circuit-opening devices must be employed, one for transformer installations and the other for sectionalizing the primary line. It can be readily understood that the building of one circuit-interrupting device which is made to function successfully in clearing the whole range of currents from the 1 to 10 ampere faults on the secondary line to those faults of 1000 to 5000 or higher ampere magnitude occurring nearer the power source introduces economic problems of even greater magnitude than discussed previously when only a device for line sectionalizing was considered. However, it can be readily seen, if one device could be made available to do the overall protection job on distribution circuits, the flexibility of application effected thereby would provide savings in handling and stocking charges, and would provide additional benefits over that now required with the two or more prior art devices it is necessary to use in order to provide the required overall overcurrent protection on a distribution circuit.

It is therefore an object of our invention to obtain greater service continuity in power distribution systems by providing a device which will cooperate with a prior art recloser to isolate faults above a predetermined current value during an interrupting operation of the recloser and will independently interrupt all fault currents below this value.

It is another object of our invention to provide one circuit-opening device capable of successfully isolating faults occurring any place on a distribution system from the secondary line of the transformer back to the power source.

It is another object of our invention to provide a fuseless circuit opening device which will be responsive to fault currents below a predetermined value to interrupt the circuit in which it is installed but responsive to fault currents above this value to maintain its contacts in engagement until such time as the fault current therethrough has been interrupted by another device.

It is also an object of our invention to provide a fuseless circuit opening device adapted for cooperative operation with a conventional prior art reclosing circuit breaker to isolate, from a distribution system, faults above a predetermined current value concerning which the recloser is responsive during an interrupting operation thereof but also adapted to isolate faults of lesser current value by interruption thereof independent of any recloser operation.

It is still another object of our invention to provide a circuit interrupter in which, upon the occurrence of a current surge through a pair of relatively movable contacts therein above a predetermined value, a contact locking means is rendered effective and a normal contact holding means is rendered ineffective so that upon subsequent interruption of the surge current by another device the contacts of the interrupter will become separated.

It is a further object of our invention to provide an automatic reclosing circuit interrupter with a contact locking means to prevent interruption of surge current through the contacts therein above a predetermined value and to subsequently permit separation of the contacts upon interruption of the surge current by another device in the circuit.

It is also an object of our invention to provide a new and improved fuseless circuit interrupting device which is simple and compact and which may be used in connection with the prior art holders for fuse cutouts.

In accordance with our invention we provide a circuit interrupting device in which the circuit completing contacts are normally held in engagement by a means which, in response to overload currents up to a predetermined value, permits the contacts to separate and interrupt the current therethrough and in which such interruption is prevented, in the event of surge currents above this value, by a contact locking means which subsequently permits disengagement of the contacts upon interruption of the higher surge current therethrough by another device in the circuit.

Our invention will be better understood from the following description when taken in connection with the accompanying drawings and the scope of our invention will be pointed out in the appended claims. In the drawings

Figure 1:
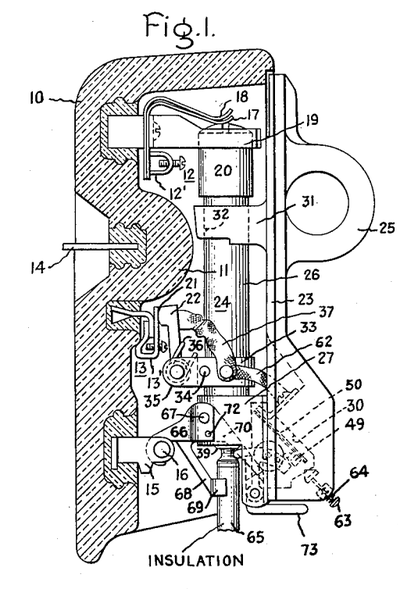
Fig. 1 is a side view, partly in section, of our fuseless circuit opening device in the normal operative position with the contacts in the current carrying position.
Figure 2:
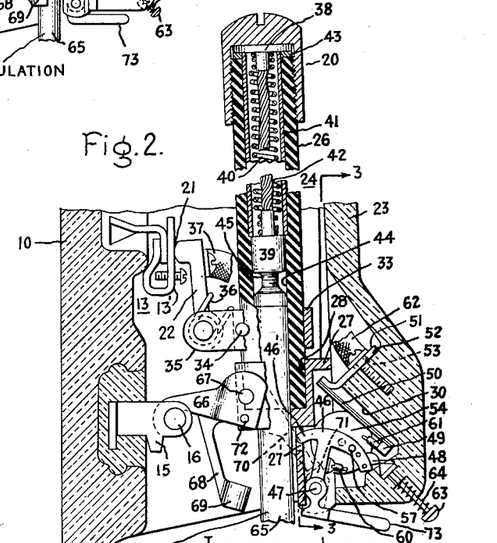
Fig. 2 is a partial view similar to Fig. 1 showing the device after the circuit has been interrupted.
Figure 3:
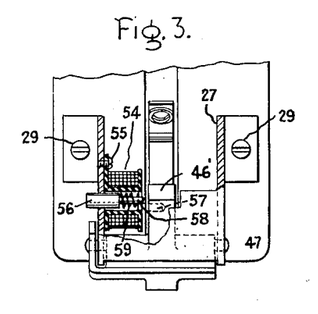
Fig. 3 is a sectional view taken on the line 3—3 of Fig. 2.

Referring now to Figures 1, 2 and 3, we have illustrated our invention in connection with a housing 10 of porcelain or similar insulating material of the size and shape used in connection with the fuse cutouts of the prior art, such as is disclosed, for example, in United States Letters Patent 2,081,813, assigned to the same assignee as the present application. Housing 10 is preferably provided with an integrally formed electric creepage and gas barrier 11, disposed between stationary contact assemblies generally indicated at 12 and 13 supported in spaced relationship in housing 10. To the rear of the housing 10 is secured a mounting bar 14 for the attachment of the casing to an electric line pole and cross-arm structure or the like. A hinge bracket 15 is suitably secured to the inner rear wall of housing 10 in the same manner as are the contact assemblies 12 and 13. Preferably these members are cemented in the recesses in the rear wall of the housing as shown in the drawing. Bracket 15 includes a pivot pin 16 by means of which a circuit breaker to be described hereinafter is pivotally supported therefrom.

Contact assemblies 12 and 13 include line terminals 12′ and 13′ respectively which are adapted to have line conductors or leads fastened thereto by means of suitable clamping screws or the like. The upper contact assembly 12 comprises a contact finger 17 backed up by means of a spring strip 18 which serves to press the finger 17 downwardly. The upper contact assembly also includes a terminal clip 19 which is arranged to receive the terminal cap 20 of our improved circuit breaker, which is similar to the terminal caps of the fuse holders of the prior art. The lower contact assembly 13 also includes a contacting surface 21 which is adapted to be engaged by a pivotally mounted contact finger 22 similar to the pivoted contact members of prior art construction. In other words the housing 10 described thus far is adapted to serve as the housing for the fuse cutouts of the prior art as well as the housing for our new and improved fuseless cutout so that prior art constructions employing fuse cutout devices may be readily converted to fuseless cutout installations, still retaining the same housing in either case.

The open side at the front of housing 10 is closed by means of a door or cover 23 preferably constructed of insulating material. This door 23 supports an electric circuit breaker generally indicated at 24 to be described in greater detail hereinafter. On the outer face of the door or cover 23, there is formed an eyelet handle 25 which may be either grasped manually or engaged by a suitable switch stick, not shown. The circuit breaker 24 when in the closed position completes the circuit between the contact assemblies 12 and 13, respectively.

Door, or cover 23, which as will be described, supports circuit breaker 24, is adapted to be pivotally supported by hinge member 15 in such a manner that the door and associated circuit breaker may be bodily removed from casing 10 whereupon the contact assemblies 12 and 13 are completely isolated from one another.

Door mounted circuit breaker 24 preferably comprises a tubular casing 26 of insulating material such as fiber or the like, which when subjected to the heat of an electric arc evolves an arc-extinguishing gas. Tubular casing 26 is suitably supported in a casting 27 having a casing-supporting opening 28 therein. Casting 27 is suitably bolted to door 23 as by means of bolts or rivets 29 best shown in Fig. 3. The casting 27 cooperates with a recess 30 in door 23 to form an enclosure within which certain parts of our electric circuit breaker generally indicated at 24, are located as will be described in greater detail hereinafter. The upper end of tubular casing 26 is preferably supported by an integral extension 31 of door 23 which is provided with an opening 32 therein through which tubular casing 26 is adapted to pass. One end of tubular casing 26 is closed by terminal cap 20 as was described above, which is threadedly mounted on the upper end thereof. A lower terminal 33 for tubular casing 26 is fastened thereto as by any suitable means such as pin 34 and comprises an extension 35 for pivotally supporting contact finger 22 which is biased as by spring means 36 in a direction to engage the contact surface 21 of the lower contact assembly 13. In order to insure good electrical connection between pivotally mounted contact finger 22 and the lower contact terminal 33 of tubular casing 26, we interconnect these members by means of a flexible shunt 37.

Mounted within tubular casing 26 is a retractable assembly shown in Fig. 2 which comprises an upper terminal button 38, a lower terminal 39, a tension spring 40, a metal tube 41, and flexible shunt 42. Upper terminal button 38 is adapted to seat on the upper end of tubular casing 26 so as to be clamped in position by terminal cap 20 with which good electrical contact is made. In order to seal the upper end of tubular casing 26 a suitable gasket 43, as shown in Fig. 2 may be provided. The lower terminal 39 of the retractable assembly forms the movable contact of electric circuit breaker 24 and is adapted for reciprocal movement within the bore 44 of tubular casing 26 from an extreme upper position against the lower end of metal tube 41, as shown in Fig. 2, to a position just outside the lower end of casing 26 as shown in Fig. 1. Upper terminal button 38 and movable contact 39 are electrically interconnected by flexible shunt 42. Tension spring 40 tends to draw movable contact 39 into tubular casing 26 to the position indicated in Fig. 2, the upward movement thereof being stopped by a tubular liner such as the metal tube 41 whose purpose will be described hereinafter. Movable contact 39 which forms the lower terminal of the retractable assembly described above is provided with an annular groove 45 and is adapted to be electrically engaged by means of an extension 46' on a hinged contact member 46 which, although slightly movable about hinge or pivot 47 supported by casting 27 in recess 30, really forms the stationary contact of our circuit breaker 24. In other words, movable contact 39 and cooperating contact 46 form the relatively movable contacts of circuit breaker 24 so that relative separation thereof is adapted to draw an arc therebetween within the bore 44 of tubular casing 26.

The annular groove 45 in movable contact 39 together with the projection 46' of hinged contact 46, which will hereinafter be referred to as stationary contact 46, provides a latching means for holding the relatively movable contacts 39 and 46 in current carrying engagement as shown in Fig. 1 against the action of the retractable assembly including tension spring 40 so long as some means is provided to hold hinged contact member 46 in the position with the extension 46' protruding through opening 27' of casting 27 to engage the annular groove 45 of movable contact 39. In order to hold hinged contact member 46 in the engaged position with movable contact 39, we provide a latching means comprising a tooth 48 on hinged contact 46 which is adapted to engage with a catch 49 supported at the free end of a bimetallic element 50. This bimetallic element 50 is mounted in the recess 30 as by means of a bimetallic element terminal 51 which is adjustably mounted to a ledge 52 of door 23 in recess 30. The adjustable mounting comprises a slotted opening 53 in bimetallic element terminal 51 which permits adjustment of the catch 49 of the latching means with relation to tooth 48 supported by hinged contact 46. It should be clear to anyone skilled in the art that an electromagnet or any suitable current responsive means might be substituted for the bimetallic element 50. Also, that by making bimetallic element 50 readily replaceable in the field, the one device can be made to meet the different overcurrent protection requirements for different sizes of transformers and different locations on a circuit with only one basic circuit interrupting device being employed. The device as thus far described is substantially identical to the circuit interrupting device disclosed in United States Letters Patent 2,357,853 assigned to the same assignee as the present application. However, in order to carry out our invention we provide an electromagnet 54 and an armature 56 which are responsive only to currents about equal to and in excess of the interrupting ability of our device. Electromagnet 54 is mounted in any suitable manner for ready field replaceability for changing its current responsitivity as by screws 55 within recess 30 on casting 27. We also provide an aperture 57 in hinged contact 46 so positioned that the aperture will be aligned with a projection 58 on armature 56 when extension 46' of hinged contact 46 is in engagement with annular groove 45 in movable contact 39. Armature 56 and projection 58 are normally maintained in the extreme left-hand position indicated in Figure 3 by the biasing action of a spring 59. Under particular abnormal current conditions to be discussed hereinafter, armature 56 will be attracted to the right against the spring bias and projection 58 thereof will engage aperture 57. So that no current will be carried by the latching means including tooth 48 and catch 49, tooth 48 is suitably insulated from hinged contact 46 as described and illustrated in detail in the previously mention Patent No. 2,357,853. A flexible shunt 60 interconnects hinged contact 46 with one end of the winding of electromagnet 54 while the other end of the winding is connected by flexible shunt 61 to the free end of bimetallic element 50. The bimetallic element terminal 51, on the other hand, is electrically interconnected with the lower terminal 33 of tubular casing 26 by means of flexible shunt 62. Whenever the extension 46' of hinged contact 46 protrudes through opening 27' of casting 27 and is held in the annular groove 45 of movable contact 39 by the latching means, as shown in Fig. 1, the contacts are held in current carrying engagement until release of the latching means as by flexing of bimetallic element 50. Normal release of the latching means may be accomplished with the aid of a manually operable plunger or member 63 mounted in the lower part of door, or cover 23, and biased in an outward direction by spring means 64. If plunger 63 is moved inwardly, it engages the catch 49 of the latching means and releases it from tooth 48.

In order to aid in the extinguishment of the arc drawn within the bore 44 of tubular casing 26 upon relative separation of contacts 39 and 46, an insulated rod 65 is provided having an outside diameter substantially equal to the diameter of movable contact 39 as best indicated in Fig. 2. With this arrangement withdrawal of contact 39 into tubular casing 26 by the retractable assembly will also cause insulating rod 65 to be drawn into tubular casing 26 whereupon an annular bore is defined between the outer surface of insulating rod 65 and the bore 44 of tubular casing 26. This annular bore provides an arc space for the arc drawn upon relative separation of contacts 39 and 46. Insulating rod 65 is preferably formed of gas-evolving insulating material so that the gas evolved therefrom aids in the rapid extinguishment of the arc drawn upon operation of circuit breaker 24. By virtue of the annular arc space, more rapid cooling of the arc is provided which consequently speeds up the interrupting process and furthermore the arc is forced or confined into a relatively small space so as to engage with a large area of insulating material from which gas is evolved when subjected to the heat of an electric arc.

To support door 23 and circuit breaker 24 from pivot pin 16 of bracket 15, a suitable hook-shaped member 66 is provided which is pivotally mounted to casting 27 as indicated at 67. Hook-shaped member 66 is adapted to engage with the pin 16 of bracket 15 whereupon the door mounted circuit breaker 24 is pivotally mounted so that if terminal clip 19 is disengaged from terminal cap 20, door 23 would pivot about the pin 16 of bracket 15 to the open position. Hook 66 is provided with an extension 68 including a guide member 69 which engages with insulating rod 65 to guide it in its movement into tubular casing 26 during the circuit interrupting operation. Hook 66 is also provided with another extension 70 which engages with a tooth 71 on hinged contact 46 so as to prevent pivotal movement of hook 66 relative to bracket 27 about pivot 67 when contacts 39 and 46 are in current carrying engagement. In other words, the circuit must be broken between relatively movable contacts 39 and 46 before door 23 can drop open.

As soon as extension 70 is released from engagement with tooth 71 the circuit breaker assembly is permitted to move downwardly both by virtue of gravity and the force of spring backed contact finger 17 about pivot 67 so that terminal clip 19 is released from terminal cap 20 by the downward movement of the entire door-mounted circuit breaker 24, whereupon the door drops to the open position by rotating clockwise about pivot 16. If it is desired to prevent the door from moving to the open position on the occurrence of a circuit-interrupting operation, a suitable screw may be inserted in opening 72 of hook 66 to engage with casting 27 thereby preventing pivotal movement about pivot 67.

In the collapsed position of the retractable assembly, as was mentioned above, movable contact 39 engages with the end of metal tube 41. The purpose of this is to prevent the high gas pressures formed within the bore 44 of tubular casing 26 upon a circuit interrupting operation from acting on the upper surface of movable contact 39 to force the contact back to the closed circuit position.

In order to aid in resetting the circuit breaker 24 hinged contact 46 is provided with a manual lever 73 which extends out of the enclosure formed between casting 27 and the door 23. With the door mounted circuit breaker 24 in the position indicated in Fig. 2, reclosing of the circuit through the fuseless cutout is accomplished by first removing the door 23 and circuit breaker 24 mounted thereon from housing 10. Next, the insulating rod 65 is grasped and pulled downwardly at the same time that manual lever 73 of hinged contact 46 is moved upwardly so that extension 46' thereof may protrude through opening 27' of casting 27 to make contact with movable contact 39 by engaging the annular groove 45 formed therein. The upward movement of manual lever 73 of hinged contact 46 will cause tooth 48 to engage with catch 49 of bimetallic thermal element 51 thereby maintaining contacts 39 and 46 in engagement.

To completely describe the operation of our fuseless circuit opening device let it be assumed that the device is installed in one of many branches or sub-branches of a distribution system, relatively remote from a substation, in which is also installed at a point in the main feeder relatively close to a substation an automatic recloser, or similar device. So as to conform to the economic objective of our invention let it also be assumed that our device has a relatively low interrupting ability below the interrupting ability of the recloser and either its interrupting operation, in response to fault currents, is more rapid than that of the recloser or the recloser is non-responsive to all fault currents within the interrupting range of our device. Under normal load conditions, the passage of current through bimetallic element 50 and the winding of electromagnet 54 in series therewith will be insufficient either to flex the bimetallic element or attract armature 56 to the right, as viewed in Fig. 3, against its spring bias. Moreover, in accordance with our invention, electromagnet 54 is so designed that an abnormal overload or fault current therethrough within the interrupting ability of our device is insufficient to attract or pull armature 56 to the right or within the core of the magnet. However, such a fault current will be sufficient to flex bimetallic element 50 thereby releasing catch 49 from engagement with tooth 48 and permitting disengagement of contact 46 from contact 39 and interruption of the circuit as hereinbefore described. Bearing in mind the conditions assumed, it is obvious that the branch or sub-branch within which our device has been installed will thereby be isolated from the balance of the system without any interruption by the recloser of service to customers on the balance of the system. On the other hand, now let it be assumed that the branch or sub-branch in which our device is installed is relatively close to a substation where the fault current through electromagnet 54 is of a value at least slightly in excess of the interrupting ability of our device and is thus sufficient to attract or pull armature 56 to the right in which case projection 58 thereon will promptly engage aperture 57 in contact 46 with which it has been aligned as previously pointed out. Obviously this current will also be effective to flex bimetallic element 50 but since projection 58 has already engaged aperture 57 subsequent release of catch 49 from tooth 48 will be ineffective to permit disengagement of contacts 46 and 39 under biasing action of spring 40 as long as the current through magnet 54 exceeds the interrupting ability of our device. However, the minimum pick-up value of armature 56 is so coordinated or related to the minimum pick-up value of the recloser in the main feeder that all such currents above the interrupting ability of our device will shortly thereafter be interrupted by the recloser at which time magnet 54 will be deenergized, and armature 56, under biasing action of spring 59, will be moved to disengage projection 58 from aperture 57 thereby permitting separation of contacts 46 and 39. In this manner the faulted branch in which our device has been installed will be isolated from the system during the momentary period in which no current is flowing therethrough so that upon the next reclosing of the recloser normal service will be restored to the balance of the system. Thus we have provided not only a relatively low cost circuit interrupting device having a limited maximum interrupting ability to thereby isolate faulted portions of circuits or apparatus in the event of relatively low overcurrent faults but one which will cooperate with a conventional recloser to also isolate a faulted branch located close to the power source in the event of high overcurrent faults exceeding its interrupting ability during an opening operation of the recloser.

Although the embodiment illustrated by Figures 1, 2 and 3 must be manually reset after each interrupting operation, our invention can conveniently be incorporated in a reclosing interrupter which interrupts a circuit in case of a fault thereon within its interrupting ability, and then automatically recloses after a predetermined period of time following the interruption.

Figure 4:
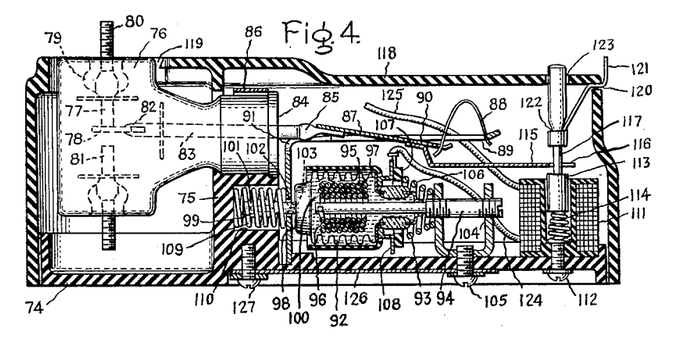
Fig. 4 is a side sectional view of our device illustrating a modification thereof.

Thus in Fig. 4 we have illustrated such a device substantially as disclosed, with the exception of the necessary added elements to carry out our invention, in the copending Smith application, Serial Number 609,188, which issued as Patent No. 2,451,338 on December 13, 1949, and assigned to the same assignee as the present application. This device is a vacuum switch comprising an insulating support 74 including an upwardly extending central portion 75 for supporting an evacuated envelope 76 formed of glass or other suitable insulating material. The switch proper, comprising the evacuated envelope 76, includes a pair of relatively movable contacts 77 and 78, the contact 77 being a stationary contact suitably supported in envelope 76 by a glass-to-metal seal 79. Contact 77 extends outside the evacuated envelope and is provided with a threaded portion 80 which forms one terminal of the circuit interrupting device. A second contact or pole 81 is also indicated and although it is not required in this application from the electrical standpoint, it is, however, useful as a stop to limit the opening movement of movable contact 78. Actually stop 81 is identical in every respect with contact 77, although it should be understood that any suitable stop might be provided, the specific construction illustrated being employed since it permits utilization of a standard vacuum switch which may be purchased on the open market. The movable contact 78 is a spade-like member preferably formed of molybdenum or the like and suitably attached as indicated at 82 to the slotted free end of a tubular switch arm 83. This arm is preferably composed of copper-plated steel tubing and extends through and is copper-brazed and sealed to a diaphragm 84 which closes the end of T-shaped evacuated container 76. The diaphragm 84 is suitably united to the glass envelope by a glass-to-metal seal. When the switch is completed and evacuated through tubular switch arm 83, this tubular arm is flattened as indicated at 85 and sealed exteriorly of casing 76.

The vacuum switch including evacuated envelope 76 is suitably fixed to upwardly extending portion 75 by a metal clamp 86 partially encircling the neck of envelope 76 in a manner so that the portion of tubular switch arm 83 extending outside of envelope 76 and which acts as a switch operating arm, extends toward one end of base 74 while the envelope part 76 of the vacuum switch extends toward the other end of base 74. Clamp 86 is maintained in clamping engagement with the neck of envelope 76 by means of screws, not shown, threadedly engaging tapped holes provided in upwardly extending portion 75. Fastened to the portion of switch arm 83 extending outside of evacuated envelope 76 is an extension 87 which is connected to one end of a flat U-shaped toggle spring 88. The other end of the toggle spring 88 is connected to one end of an L-shaped operating lever 89 which has a portion 90 substantially parallel to tubular switch arm 83 and a portion 91 substantially perpendicular to tubular switch arm 83. L-shaped member 89 is bifurcated so that extension 87 may be interposed between the bifurcations. At the junction between the portions 90 and 91 of L-shaped member 89 there are provided a pair of thin hinge strips, not shown, which are welded, or otherwise suitably fastened to L-shaped member 89 and in turn fastened to the upwardly extending portion 75 of base 74 by screws, as more clearly illustrated in the aforementioned copending Smith application. With this arrangement, if the portion 91 of lever 89 is moved to the left clockwise about the hinges, toggle spring 88 will cause extension 87 to be moved upwardly so that contacts 77 and 78 are separated with a snap action. If portion 91 of lever 89 is subsequently moved to the right counterclockwise about the hinges, contacts 77 and 78 are reclosed with a snap action by virtue of toggle spring 88. In other words, means comprising a sort of over-center device are provided to produce snap action of the contacts both in opening and closing In order to cause relative movement between contacts 77 and 78 in response to overload faults on the circuit in which the device is installed, a flexible metal bellows assembly is provided comprising a metal bellows 92 having one end closed by an insulating seal, such as a glass seal 93 and an adjustment rod 94. Rod 94, which is provided with a threaded portion exteriorly of bellows 92, extends into the interior of the flexible metal bellows but is insulated therefrom by the glass or other suitable insulating member 93 which seals rod 94 to bellows 92. The end of rod 94 within bellows 92 is electrically connected to one end of heater coil 95, as indicated at 96, while the other end of heater coil 95, as indicated at 97, is connected to the walls of bellows 92. The end of bellows 92, which is cylindrical in form, opposite the end closed by insulating member 93, is closed by a flat wall 98 which is provided with a tubular extension 99 through which the bellows may be filled with a suitable liquid 100 and sealed as indicated at 101. The bellows 92 is preferably completely filled with the liquid 100 which is preferably chosen so as to have a boiling temperature at substantially the operating temperature of the vacuum switch. Heater coil 95 is preferably formed of a high resistance wire, such as wire which may be purchased on the market under the trade name Nichrome.

Preferably, the bellows assembly comprising bellows 92 is mounted so the tubular extension 99 extends through an opening 102 in portion 91 of lever 89. Portion 91 of lever 89 is provided with a raised portion 103 so that line contact with the flat wall 98 of bellows 92 is provided.

The rod 94 extending outside of bellows 92 is threadedly mounted in a U-shaped support 104 supported from base 74 as by means of a screw 105. A suitable coiled spring 106 is interposed between U-shaped member 104 and an insulating disk 107, which in turn engages a contact ring 108 in slidable electrical connection with the end of bellows 92. Spring 106 biases contact ring 108 into electrical contact with the right-hand end of the bellows to insure good electrical contact therebetween. Preferably, the bellows assembly is spring loaded and to this end a coiled spring 109 is provided which is mounted in a recess 110 in upwardly extending portion 75 of base 74. One end of coiled spring 109 engages portion 91 of L-shaped lever 89 so as to load the bellows assembly with a force of the order of ten pounds to the square inch or so. With this arrangement no movement of the bellows will occur until the pressure of the liquid within the bellows exceeds the spring loading. Adjustment of the trip temperature may be obtained by rotating threaded rod 94 which causes slidable rotation of the entire bellows assembly between one end of the bellows and contact ring 108.

To adapt the device thus far described for cooperation with a reclosing circuit breaker having a relatively higher interrupting ability and employment as an isolating device in the event of permanent faults exceeding its interrupting ability, we provide an electromagnet 111 fixed to support 74 as by screw 112, an armature 113 biased upward by spring bias 114 and a horizontally projecting extension 115 welded or otherwise suitably fixed to switch arm extension 87. Extension 115 is provided with a slot 116 of a size to slidably accommodate therein an upwardly extending projection of armature 113 having a reduced cross section 117. A suitable cover of insulating material 118 is provided which may be fastened to base 74 by any suitable readily detachable means. Cover 118 is provided with an opening 119 through which the portion 80 of contact 77 may extend and also a slot 120 in which a holding latch 121 is pivotally supported. Armature 113 is normally maintained in the position indicated against the biasing action of spring 114 tending to move it upward by the engagement of holding latch 121 with a groove 122 cut in the enlarged portion of armature 113 above the reduced section 117. The upper end of armature 113 projects through an opening 123 in cover 118 to facilitate resetting of the armature from the exterior of the device. One end of the winding of electromagnet 111 is electrically connected by flexible conductor 124 to contact ring 108 while the other end of the winding is electrically connected by flexible conductor 125 to switch arm 83. U-shaped member 104 and screw 105 are electrically connected to a conducting member 126 extending along the bottom of base 74 and terminating in a terminal screw 127 to which an external conductor may be connected.

When our device is in the closed circuit position indicated, current flows from terminal 80 through stationary contact 77, movable contact 78, switch arm 83, flexible conductor 125, electromagnet 111, flexible conductor 124, contact ring 108, bellows 92, heater coil 95, rod 94, U-shaped member 104, screw 105, conducting member 126 to terminal screw 127.

Under normal load conditions, the passage of current through the heater coil 95 and the winding of electromagnet 111 in series therewith will be insufficient to either expand bellows 92 or attract armature 113 down into the core of the magnet against its spring bias. Also, as was the case with respect to electromagnet 54 in the main embodiment, electromagnet 111 is so designed that an abnormal temporary overload or fault current therethrough within the interrupting ability of the device will be insufficient to attract or pull armature 113 within the core of magnet 111. The bellows assembly, however, is so designed as to be responsive to such fault currents upon the occurrence of which the current flowing through heater coil 95 causes the liquid 100 to heat up rapidly to the vapor point of the liquid. Such heating of liquid 100 and vaporization thereof causes bellows 92 to expand so as to push against the raised point 103 on portion 91 of L-shaped lever 89, thereby moving it in a clockwise direction about its hinges with the result that flat spring 88 with a toggle action moves switch arm 83, thereby causing contacts 77 and 78 to separate with a snap action. This interrupts the circuit through the heater coil 95. Thereupon the vapor formed in bellows 92 condenses back to a liquid allowing the bellows to contract so that toggle spring 88 and coil spring 109 reverses the motion of switch arm 83 causing the contacts 77 and 78 to automatically reclose. Since slot 116 in extension arm 115 is larger than reduced section 117 of armature 113 the resulting upward and downward movement of the end of arm 115 which is fixed to switch arm extension 87 will not be impaired by these opening and closing movements of contact 78.

Like the main embodiment, this modification of our invention is designed to cooperate with an automatic reclosing circuit breaker located elsewhere in the distribution system to isolate a portion of the circuit in the event of a more or less permanent fault thereon having a relatively high surge value in excess of the interrupting ability of our device. Thus, upon the occurrence of such a fault, armature 113 as well as the bellows assembly will be responsive thereto so that armature 113 will be quickly attracted or drawn in within the magnet core against its spring bias 114 thereby engaging the enlarged portion of armature 113 above the reduced section 117 with the end of extension arm 115. This downward movement will release holding latch 121 from engagement with groove 122 and because of the location of the center of gravity of the latch it will thereafter swing free within supporting slot 120 to a position out of the travel path of armature 113. Although the subsequent expansion of bellows 92 will tend to separate contacts 77 and 78 as hereinbefore described, they will nevertheless be held in engagement by the greater attractive force of armature 113 bearing down on the free end of arm 115 until such time as the automatic reclosing circuit breaker interrupts the circuit. When this subsequently occurs magnet 111 will become deenergized and armature 113 will be moved upward by spring 114 beyond the position it normally occupies, inasmuch as the holding latch is no longer in the path of its travel, so that the lower enlarged portion of the armature below reduced portion 117 will engage extension arm 115. Thus the contacts 77 and 78 will thereafter be maintained out of contact by the biasing action of spring 114 and thereby isolate the circuit in which the device has been installed from the system until manually reset. Indication of the need for such manual resetting is given by the upper end of armature 113 protruding a greater distance than normal through the cover opening 123. The upper end of the armature 113 could be painted red on the portion protruding so as to be more positive in indicating the need for manual resetting of the device. After removal of the fault, this may conveniently be performed merely by pushing down on the upper end of armature 113 projecting out through cover opening 123, simultaneously pushing the portion of holding latch 121 outside the cover to the right in a clockwise direction and then releasing the downward pressure on the end of the armature so that the inner end of latch 121 will again engage groove 122 to hold the armature against its spring bias in the normal operating position indicated.

Figure 5:
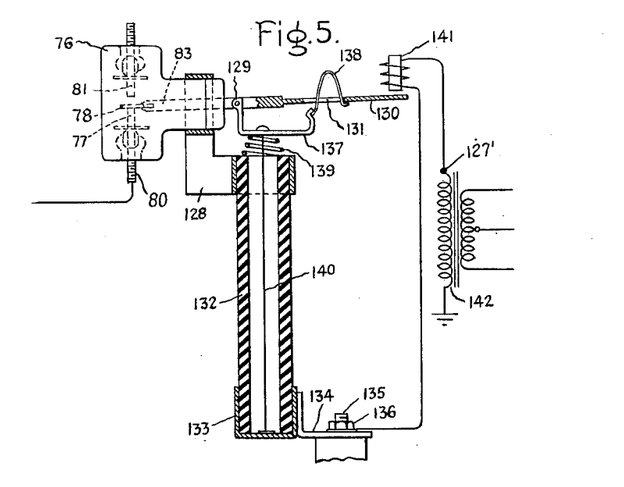
Fig. 5 is a more or less diagrammatic illustration of still another modification of our device.

The Fig. 4 vacuum switch modification may be further modified so that the contacts 77 and 78 will automatically be reset even after the occurrence of higher current faults and thereby permit its employment within a transformer as disclosed in the aforementioned Smith application. Thus in Fig. 5 we have more or less diagrammatically illustrated such a modified device comprising a stationary contact 77, a movable contact 78 mounted on a switch arm 83, and a stop 81 all mounted within an evacuated envelope 76 which is in turn mounted in any suitable manner on fixed support 128. Support 128 is mounted on insulating tube 132 the lower end of which is enclosed by conducting cap 133. Conducting cap 133 and tube 132 are in turn fixedly supported by means of conducting bracket 134 welded to conducting cap 133 and fixed to a transformer or any suitable supporting structure by mounting stud 135 and nut 136. Switch arm 83 outside of envelope 76 is pivotally supported at a point close to the envelope enclosing diaphragm on pin 129 which is also mounted on support 128 or any other suitable fixed support. Welded or otherwise suitably fixed to switch arm 83 is switch arm extension 130 of magnetic material containing a slot 131 therein. A U-shaped actuating lever 137 is also pivotally mounted on pivot pin 129. Lever 137 is bifurcated at the pivot end so as to be centrally disposed with respect to extension arm 130 and has a width, normal to the plane of the drawing, less than the width of slot 131 in arm 130 to permit freedom of motion therein. The free end of lever 137 is interconnected with extension arm 130 by toggle spring 138 similar to toggle spring 88 in our Figure 4 modification. Lever 137 is biased upward in a counterclockwise direction about pivot pin 129 by coil spring 139 interposed between lever 137 and the top open end of insulating tube 132. However, further upward motion of lever 137 beyond that indicated in the drawing is normally prevented by the resisting tension stress within conducting thermal wire 140 fixed in any suitable manner to both lever 137 and conducting cap 133. To maintain contacts 77 and 78 in engagement pending interruption of an abnormally high surge by a reclosing circuit breaker we provide an electromagnet 141 disposed in magnetic attractive relationship with respect to magnetic switch arm extension 130. One end of the electromagnet winding is electrically connected to a terminal 127' which is the equivalent of terminal 127 in our Fig. 4 modification and thence, so as to illustrate a practical application of our device, to the primary 142 of a transformer while the other end is electrically connected to bracket 134 at mounting stud 135. Under normal load conditions, contacts 77 and 78 are in engagement and the current passes through the device from the terminal 80 through stationary contact 77, movable contact 78, switch arm 83, pivot pin 129, actuating lever 137, thermal wire 140, conducting cap 133, bracket 134, electromagnet 141 to terminal 127' and thence to the primary of the transformer 142. In the event of relatively low overcurrent surges due to a fault, either within the transformer or in the circuit on the load or secondary side thereof, which the device is competent to interrupt, thermal wire 140 will increase in temperature and expand thereby permitting coil spring 139 to move actuating lever 137 upward counterclockwise about pivot pin 129 with the result that flat toggle spring 138 with a toggle action moves switch arm extension 130 downward or clockwise about pin 129, thereby causing contacts 77 and 78 to separate with a snap action. This interrupts the circuit through thermal wire 140 which then contracts and pulls lever 137 downward against the bias of spring 139 so that spring 138 reverses the motion of switch arm extension 130 causing contacts 77 and 78 to automatically reclose. Although such faults having values within the interrupting ability of the device are effective to expand thermal wire 140 as described, they will be ineffective to cause any attractive force by magnet 141 in series therewith toward magnetic extension arm 130. However, in the event of a fault having a relatively high value in excess of the interrupting ability of the device and concerning which an automatic reclosing circuit breaker is responsive, electromagnet 141 will quickly attract or pull the end of extension arm 130 in an upward direction thereby holding contacts 77 and 78 in the closed circuit position. Faults of such value will also cause thermal wire 140 to expand so that coil spring 139 will move actuating lever upward. Nevertheless, the contacts will be maintained in engagement until such time as the automatic recloser interrupts the circuit through magnet 141. Thereupon, magnet 141 will become deenergized and the contacts will be separated by spring 138 which had previously been thrown by the upward movement of lever 137, to a position to effect disengagement thereof. However, upon the occurrence of the interruption by the automatic recloser, thermal wire 140 will also begin to cool and contract thereby effecting relatively prompt reengagement of contacts 77 and 78 so that in the event the fault has been removed, our device will have been automatically reset to feed current to the transformer upon a subsequent reclosing of the automatic reclosing circuit breaker.

While we have, in accordance with the patent statutes, shown and described a particular embodiment of our invention mounted on a cover for use with prior art fuse cutout housings and modifications thereof as adapted to reclosing vacuum switches, we do not desire our invention to be limited to the particular construction shown and described for it will, of course, be evident to those skilled in the art that changes and modifications may be made without departing from our invention. We, therefore, aim in the appended claims to cover all such changes and modifications as fall within the true spirit and scope of our invention.

What we claim as new and desire to secure by Letters Patent of the United States is:

1. In a circuit interrupter, a pair of relatively movable cooperating contacts, means biasing said contacts out of engagement, a latch normally engaging one of said contacts to hold said contacts in engagement, a bimetallic element responsive to a current through said contacts above a predetermined value to release said holding latch, and a normally ineffective locking means including a coil winding and an armature directly engageable with said one contact to prevent separation of the contacts in response to current therethrough greater than said first mentioned predetermined value.

2. In a circuit interrupter, a pair of relatively movable cooperating contacts, means biasing said contacts out of engagement, a latch normally engaging one of said contacts to hold said contacts in engagement, a bimetallic element responsive to a current through said contacts above a predetermined value to release said holding latch, a normally ineffective locking means comprising electromagnetic means including a coil winding and an armature directly engageable with said one contact to prevent separation of the contacts, and means responsive to current through the contacts greater than said first mentioned predetermined value for substantially instantaneously rendering said locking means effective to prevent separation of said contacts as long as the current is above said greater value.

3. In an electric circuit opening device, the combination of a housing and a cover for closing an open side of said housing, a circuit interrupter mounted on said cover comprising a pair of relatively movable contacts, means biasing said contacts out of engagement, a recess in said cover, means holding said contacts in engagement against biasing action of said bias comprising a bimetallic element mounted in said recess and normally engageable with one of said contacts, and a contact locking means comprising an electromagnet mounted in said recess and including a coil winding and an armature directly engageable with one of said contacts, said bimetallic element responsive to a current through said contacts above a predetermined value to release said holding means and said electromagnet responsive to the same current to cause engagement of said armature with said one contact to maintain said contacts in engagement as long as said current remains above said predetermined value.

4. In a circuit interrupting device, the combination of an evacuated envelope, a pair of relatively movable contacts mounted within said envelope, a movable contact arm for one of said contacts, means outside of said envelope including an over-center device for causing said contacts to operate with a snap action for both closing and opening operations thereof, means for controlling the operation of said last mentioned means comprising a spring holding said contacts in engagement, a contact separating means comprising a flexible bellows assembly and a contact locking means comprising an electromagnet, an armature directly engageable with said contact arm to lock said contacts in engagement and normally biased to lock said contacts in the open position and a holding latch engageable with said armature to render said locking means normally ineffective to lock said contacts either in open or closed position, said holding latch biased to the unlatched position, said bellows assembly responsive to current through said contacts above a predetermined value to disengage said contacts against the bias of said holding spring and said locking means responsive to current through said contacts greater than said first mentioned predetermined value to release said armature holding latch and attract said armature for engagement with said contact arm to the contact locking position until the current through said contacts drops below said greater value at which time said armature is rendered effective under its spring bias to lock said contacts in the open position.

5. In a circuit interrupter, a pair of relatively movable cooperating contacts, a movable contact arm for one of said contacts, means biasing said contacts in engagement, thermal means responsive to current through said contacts above a predetermined value to effect disengagement of said contacts, and an electromagnet including a coil winding acting directly upon said contact arm in response to current through said contacts above a second predetermined value greater than said first mentioned predetermined value to maintain said contacts in engagement as long as the current therethrough exceeds said greater value.

6. In a circuit interrupting device, the combination of an evacuated envelope, a pair of relatively movable contacts mounted within said envelope, a movable contact arm for one of said contacts, means outside of said envelope for causing said contacts to operate with a snap action for both closing and opening operations thereof, means for controlling the operation of said last mentioned means comprising a spring biasing said contacts out of engagement, a thermal wire responsive to current through said contacts above a predetermined value to permit disengagement of said contacts, and an electromagnet comprising a coil winding acting directly upon said contact arm in response to the same current value to maintain said contacts in engagement as long as the current therethrough exceeds said predetermined value.

7. In a circuit interrupter, a pair of relatively movable cooperating contacts, a movable contact arm for one of said contacts, means biasing said contacts out of engagement, thermal responsive means holding said contacts in engagement against biasing action of said biasing means, said holding means responsive to current through said contacts above a predetermined value to permit disengagement of said contacts and an electromagnet including a coil winding acting directly upon said contact arm in response to current through the contacts above a second predetermined value greater than said first mentioned predetermined value to maintain said contacts in engagement as long as the current therethrough exceeds said greater value.

8. In a circuit interrupting device, a pair of relatively movable contacts, thermal means responsive to a current through said contacts which is above a first predetermined value for conditioning the contacts to open, magnetic means including a coil winding acting directly upon one of said contacts in response only to current through said contacts which is above a predetermined value in excess of said first predetermined value to make said conditioning by said thermal means ineffective to cause movement of said contacts while said current is above said second predetermined value, and means for positioning said contacts in the open position until reset by a force external to the device when said current subsequently falls below said first predetermined value, said thermal means being effective to maintain said conditioning for a period of time after said current falls below said first predetermined value.

9. In a circuit interrupting device, a pair of relatively movable contacts, a movable contact arm for one of said contacts, an overcenter spring arranged to move said contacts from closed to open and from open to closed positions with a snap action, thermal means responsive to current through said contacts above a predetermined value for biasing said overcenter spring to cause said snap action, and a second means including a coil winding of an electromagnet acting directly upon said contact arm in response only to current through said contacts of a second predetermined value greater than said first predetermined value for preventing an opening movement of said contacts even though said overcenter spring is biased to cause said contact opening by said thermal means, said thermal means being effective to maintain said overcenter spring biased in a position whereby opening of said contacts is effected for a period of time after said current thereafter falls below said first predetermined value.

10. In a circuit interrupting device a pair of relatively movable contacts, a movable contact arm for one of said contacts, an overcenter spring arranged to move said contacts from closed to open and from open to closed positions with a snap action, thermal means responsive to current through said contacts above a predetermined value for biasing said overcenter spring to cause said snap action, and a second means including a coil winding of an electromagnet acting directly upon said contact arm in response only to current through said contacts of a second predetermined value greater than said first predetermined value for preventing an opening movement of said contacts while said current is in excess of said second predetermined value even though said overcenter spring is biased to cause said contact opening by said thermal means, said thermal means being effective to maintain said overcenter spring biased in a position whereby opening of said contacts is effected for a period of time after said current thereafter falls below said first predetermined value.

11. In a circuit interrupting device a pair of relatively movable contacts, a movable contact arm for one of said contacts, an overcenter spring arranged to move said contacts from closed to open and from open to closed positions with a snap action, a first means responsive to current through said contacts above a predetermined value for biasing said overcenter spring to cause snap action, a second means including a coil winding of an electromagnet acting directly upon said contact arm in response only to current through said contacts of a second predetermined value greater than said first predetermined value for preventing an opening movement of said contacts even though said overcenter spring is biased to cause said contact opening by said first means, and means released by action of said second means after said current falls below said second predetermined value for blocking said contacts in the open position irrespective of the action of said first means.

12. In a circuit interrupting device, a pair of relatively movable contacts, a movable contact arm for one of said contacts, means normally holding said contacts in engagement, thermal responsive means electrically connected in series with said contacts and operative in response to current through said contacts exceeding a predetermined value to release said holding means and effect disengagement of said contacts, and quick acting electromagnetic means including a coil winding electrically connected in series with said contacts and acting directly upon said contact arm in response to current above a second predetermined value in excess of said first mentioned predetermined value to prevent disengagement of said contacts while the current therethrough exceeds said second predetermined value and to permit disengagement of said contacts when said current subsequently falls below said first mentioned predetermined value.

13. In a circuit interrupting device, a pair of relatively movable contacts, a movable contact arm for one of said contacts, means normally holding said contacts in engagement, thermal means electrically connected in series with said contacts and responsive to current therethrough above a predetermined value to release said holding means and effect disengagement of said contacts and quick acting electromagnetic means including a coil winding and an armature directly engageable with said contact arm to prevent disengagement of said contacts upon the occurrence of a current above a second predetermined value through said contacts in excess of said first mentioned predetermined value and to permit disengagement of said contacts when said current subsequently falls below said first mentioned predetermined value.

GEORGE F. LINCKS.
SIDNEY R. SMITH, JR.

REFERENCES CITED

The following references are of record in the file of this patent:

UNITED STATES PATENTS

| Number | Name | Date |
| --- | --- | --- |
| 1,684,249 | Stevenson | Sept. 11, 1928 |
| 2,073,286 | Raney | Mar. 9, 1937 |
| 2,177,774 | Jackson | Oct. 31, 1939 |
| 2,314,693 | Dickinson | Mar. 23, 1943 |
| 2,357,853 | Smith | Sept. 12, 1944 |

FOREIGN PATENTS

| Number | Country | Date |
| --- | --- | --- |
| 469,245 | Germany | Dec. 6, 1928 |